United States Patent
Pengelly (10) Patent No.: US 11,885,371 B2
(45) Date of Patent: Jan. 30, 2024

(54) CONNECTION SYSTEM (71) Applicant: Pengelly Design Ltd, London (GB)

(72) Inventor: Simon Pengelly, London (GB)

(73) Assignee: PENGELLY DESIGN LTD, London (GB)

( * ) Notice: Subject to any disclaimer, the term of this patent is extended or adjusted under 35 U.S.C. 154(b) by 14 days.

(21) Appl. No.: 17/827,436

(22) Filed: May 27, 2022

(65) Prior Publication Data

US 2022/0389948 A1 Dec. 8, 2022

(30) Foreign Application Priority Data

Jun. 4, 2021 (GB) ..................................... 2108031

(51) Int. Cl.
*F16B 9/00* (2006.01)
*F16B 12/12* (2006.01)

(52) U.S. Cl.
CPC .............. *F16B 9/05* (2018.08); *F16B 12/125* (2013.01); *A47B 2230/0077* (2013.01); *F16B 2200/30* (2018.08)

(58) Field of Classification Search
CPC ............ A47B 13/021; A47B 2013/022; A47B 2230/0077; A47C 4/02; A47C 4/021; A47C 7/00; A47C 7/002; F16B 5/0052; F16B 9/05; F16B 12/125; F16B 2012/046; F16B 2012/466; F16B 2200/30; Y10T 403/58;

(Continued)

(56) References Cited

U.S. PATENT DOCUMENTS 4,867,598 A * 9/1989 Winter, IV ................ E04B 2/08
403/381
8,104,989 B2 * 1/2012 Liu ....................... F16B 12/125
403/353
(Continued)

FOREIGN PATENT DOCUMENTS

CN 202932432 U 5/2013
CN 208624975 U 3/2019
(Continued)

OTHER PUBLICATIONS

"Search Report under Section 17" in GB patent application GB2108031. 2, dated Nov. 30, 2021.
(Continued)

*Primary Examiner* — Josh Skroupa
(74) *Attorney, Agent, or Firm* — William H. Bollman (57) ABSTRACT

A connection system for removably connecting first and second pieces one to another. The connection system comprises: a tapering recess formed in, or connected to, the first piece. The tapering recess has an opening which is shaped and dimensioned to receive a wedge formed in, or connected to, the second piece. The wedge has a dovetail profile which is adapted to engage with walls of the recess. The wedge is shaped and dimensioned to slide in a first direction and thereby wedge into the tapered recess. Each piece has at least one aperture which receives a lock piece. The first and second pieces when connected and which when oriented in a user preferred direction, cause the lock piece to fall from a first aperture into a second aperture, thereby locking the wedge in the tapering recess and preventing movement in an opposite sliding direction.

15 Claims, 6 Drawing Sheets

(58) Field of Classification Search
CPC ............ Y10T 403/581; Y10T 403/587; Y10T 403/7094
USPC ................................ 403/315, 316, 319, 381
See application file for complete search history.

(56) References Cited

U.S. PATENT DOCUMENTS

| | | | |
|---|---|---|---|
| 2006/0165482 A1* | 7/2006 | Olberding | E04B 1/24 |
| | | | 403/381 |
| 2011/0255915 A1* | 10/2011 | Chen | F16B 12/125 |
| | | | 403/381 |
| 2014/0161518 A1 | 6/2014 | Ko | |

FOREIGN PATENT DOCUMENTS

| | | | | |
|---|---|---|---|---|
| DE | 3838304 A1 * | 5/1990 | ....... A47B 2013/022 |
| DE | 9411665 U1 * | 2/1995 | ............ F16B 12/125 |
| DE | 202009010593 U1 | 11/2009 | |
| EP | 0368171 | 5/1990 | |
| GB | 786497 A * | 11/1957 | ................ A47C 4/02 |
| WO | WO-2011110977 A1 * | 9/2011 | ............ F16B 12/125 |
| WO | WO-2019117780 A1 * | 6/2019 | ............ A47C 4/021 |

OTHER PUBLICATIONS

"Search Report under Section 17" in GB patent application GB2108031. 2, dated Dec. 1, 2021.

* cited by examiner

CONNECTION SYSTEM

This application claims priority from GB2108031.2 filed Jun. 4, 2021, the entirety of which is explicitly incorporated herein by reference.

FIELD

The present invention relates to a connection system for removably connecting first and second pieces one to another, and in particular a connection system for connecting first and second pieces of an item of furniture together. The present invention also relates to an item of furniture assembled from first and second pieces connected together by the connection system.

BACKGROUND

There is a rise in demand for modular, flat pack furniture which can be built by the consumer at home. Flat pack furniture can however be difficult to assemble using conventional connection systems and this can result in the furniture being incorrectly assembled and/or breaking.

There is therefore a need for a connection system which can be easily used to assemble an item of furniture quickly and effectively. There is also a need for a connection system which can maintain the connection between first and second pieces with reduced risk of separation and/or failure.

PRIOR ART

Chinese utility model CN 202932432 (Huang) describes a stool with a seat and more than three stool legs. A connecting device is arranged between the stool legs and the stool seat.

European patent application number EP 0368171 (Meier) describes a table with a table top and a frame and three or more table legs attached to the underside of the table top or to the frame. A base plate is attached to the underside of the table for each table leg and the base plate and table legs have corresponding guides for their detachable insertion into the base plate.

German utility model DE 202009010593 (Kesseboehmer) discloses a fastening device with a receiving means which has a guide rail and a clamp means.

United States patent application number US 2014/0161518 (Ko) describes a connector for joining two furniture modules or other objects, comprising: a first hardware piece; a second hardware piece having a main cavity for receiving the first hardware piece, and a detent mechanism, which when deployed holds the first and second hardware pieces in a locked state.

Chinese utility model CN 208624975 (Xie et al) describes a detachable stool comprising: a front side of a bench board and at least one stool foot which is connected to a stool board.

SUMMARY OF INVENTION

According to a first aspect of the present invention there is provided a connection system for removably connecting first and second pieces one to another comprising: a tapering recess formed in, or connected to, the first piece, the tapering recess has an opening which is shaped and dimensioned to receive a wedge formed in, or connected to, the second piece, the wedge has a dovetail profile which is adapted to engage with walls of the recess, and the wedge is shaped and dimensioned to slide in a first direction and thereby wedge into the tapered recess; each piece has at least one aperture which receives a lock piece, the first and second pieces when connected and which when oriented in a user preferred direction, cause the lock piece to fall from a first aperture into a second aperture, thereby locking the wedge in the tapering recess and preventing movement in an opposite sliding direction.

The aperture in the first piece and the aperture in the second piece preferably face one another when the first and second pieces are properly connected.

The aperture in the first and second pieces is preferably substantially cylindrical. The lock piece is preferably substantially cylindrical.

In one embodiment, the depth of the second aperture is less than the depth of the first aperture.

The height of the lock piece may be greater than the depth of the second aperture. The height of the lock piece may be at least equal to the depth of the first aperture.

In one embodiment, the wedge has a dovetail whose angle of profile is substantially the same as the angle of the opening of the recess which is configured to receive the dovetail.

The lock piece may be ferro-magnetic. In one embodiment, the lock piece is steel, preferably stainless steel.

The recess may have a tear shaped in cross-section.

In one embodiment, the connection system is configured such that in use the lock piece falls from the first aperture into the second aperture and is retained therein by gravity.

A connection system according to any preceding claim wherein a poke hole is provided in the second piece, leading to the second aperture, through which a rod passes for displacing the lock piece from the second aperture to the first aperture.

According to a second aspect of the present invention, there is an item of furniture comprising a connection system as herein described.

The item of furniture may for example be selected from the group comprising: a chair, a bed, a stool, a table, a cabinet and a desk.

According to a third aspect of the present invention, there is provided a method of manufacturing an item comprising a connected first and second pieces, the method comprising:

obtaining a connection system as herein described;

inserting the wedge formed in, or connected to, the second piece into the opening of the tapering recess of the first piece;

sliding the wedge in a first direction into the tapered recess causing the lock piece to fall from the first aperture into the second aperture thereby locking the wedge in the tapering recess and connecting the first and second pieces together.

Embodiments of the present invention will now be described in more detail with reference to the accompanying Figures:

DETAILED DESCRIPTION OF PREFERRED EMBODIMENTS

With reference to the Figures, the connection system 1 of the present invention can be used to assemble an item, for example an item of furniture, by removably connecting a first and second piece together. In the illustrated embodiment, the item of furniture is a table. It is however to be understood that the connection system may be used to connected pieces of any item and is not to be limited to furniture items.

The connection system 1 comprises three spaced apart tapering recesses 2 formed on the underside of the first piece 4. Each tapering recess 2 has an opening which is shaped and dimensioned to receive a wedge 6 formed in, or connected to, the second piece 8. In the illustrated example, the tapering recesses 2 are tear shaped in cross-section. The wider end of the tear shaped tapering recess 2 is located towards the centre of the first piece 4.

The underside of the first piece 4 provides three spaced apart first apertures 10 which are substantially cylindrical in shape. Each aperture 10 is aligned with the longitudinal axis of a corresponding tapering recess 2. Each aperture 10 is located adjacent and spaced apart from the narrow end of a corresponding tapering recess 2. The first apertures 10 are located adjacent the periphery of the first piece 4.

The upper portion of each second piece 8 comprises a wedge 6 having a dovetail profile which is adapted to engage with walls of the corresponding tapering recess 2. The wedge 6 is shaped and dimensioned to slide in a first direction and thereby wedge into the corresponding tapering recess 2.

Each wedge 6 has a dovetail whose angle of profile is substantially the same as an angle of opening of the tapering recess 2 which receives the dovetail.

Each wedge 6 comprises a second aperture 12 which is substantially cylindrical in shape.

The depth of the second aperture 12 is less than the depth of the first aperture 10. Once assembled, the first aperture 10 in the first piece 4 and the second aperture 12 in the second piece 8 face one another when the first and second pieces 4,8 are properly connected.

A substantially cylindrical lock piece 14 is received with the second aperture 10. The lock piece 14 may be composed of any suitable material, such as for example stainless steel. The height, as measured between opposed ends thereof, of the lock piece 14 is greater than the depth of the second aperture. The height of the lock piece 14 is preferably at least equal to the depth of the first aperture 10.

Figure 1:
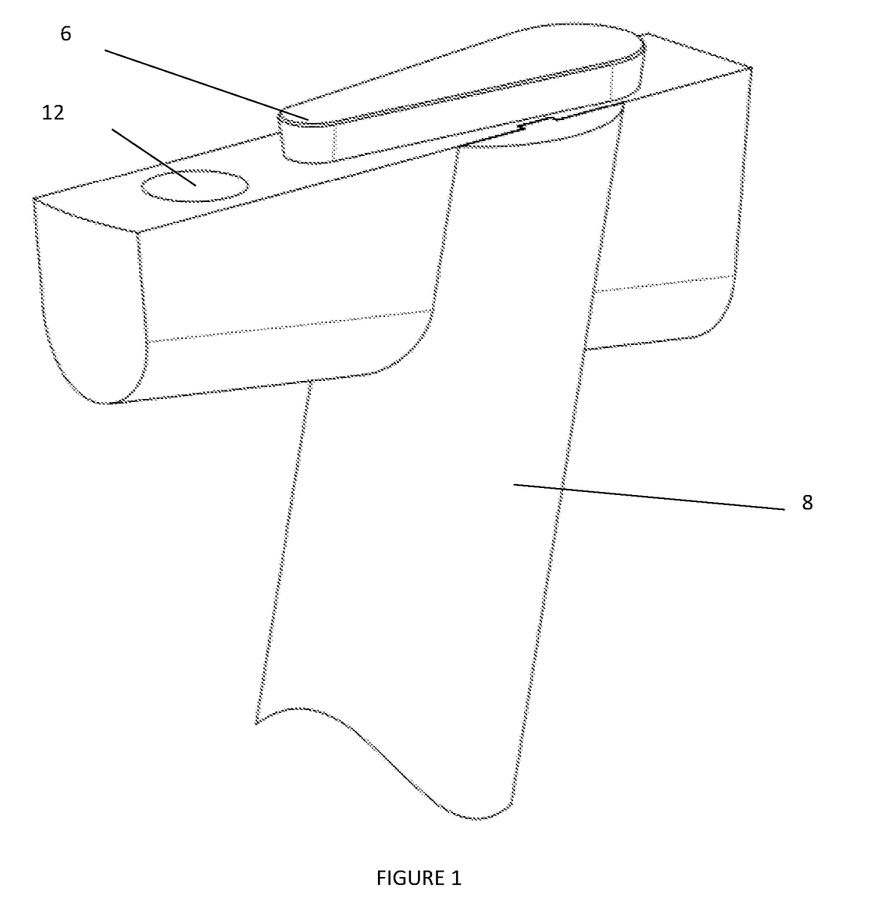
FIG. 1 is a schematic illustration of a perspective view of an upper portion of a second piece of a leg of a table according to one embodiment of the present invention.
Figure 2:
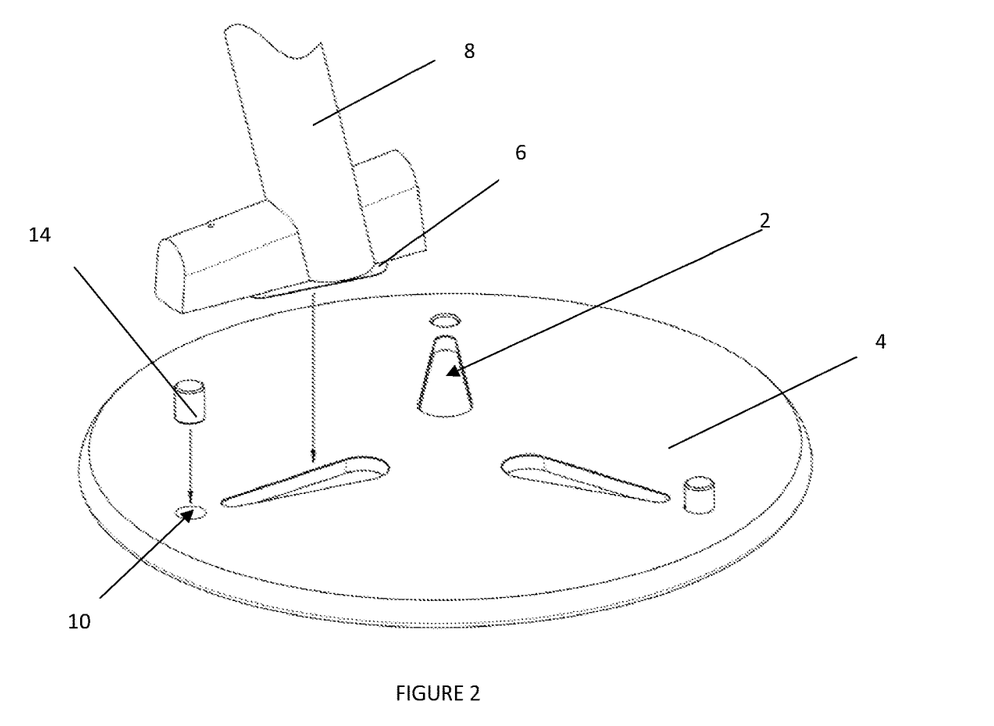
FIG. 2 is a schematic illustration of a perspective view from above during assembly of the table of FIG. 5 according to one embodiment of the present invention, in which an upper portion of the second piece of the leg of FIG. 1 is inserted into the opening of the tapering recess provided on the underside of the first piece, the table top.
Figure 3:
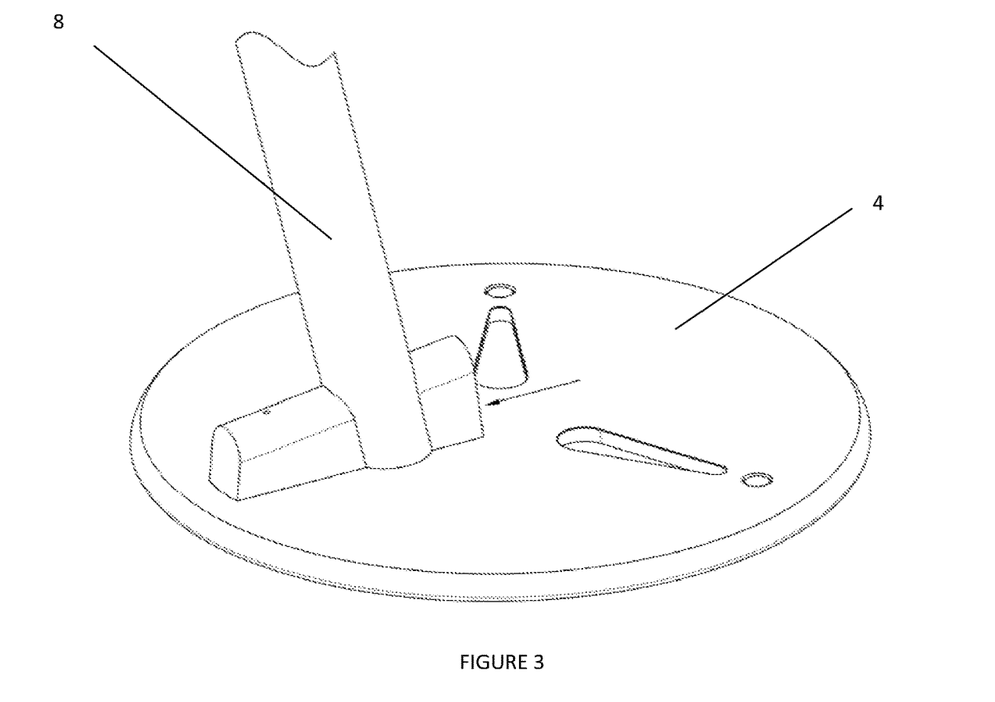
FIG. 3 is a schematic illustration of a perspective view from above of a further stage during assembly of the table of FIG. 5, in which the upper portion of the second piece of the leg of FIGS. 1 and 2, is slid in a first direction into the tapered recess of the table top.

In use, the user places the wedge 6 of each second pieces 8 into the corresponding tapering recess 2 (FIG. 2). The user then slides the wedge 6 of the second piece within the recess 2 in a first direction (FIG. 3). As the wedge 6 slides within the recess 2, the wedge 6 becomes locked in the recess 2 and the first aperture 10 of the first piece becomes aligned with the second aperture 12 provided by the second piece 8.

Figure 4:
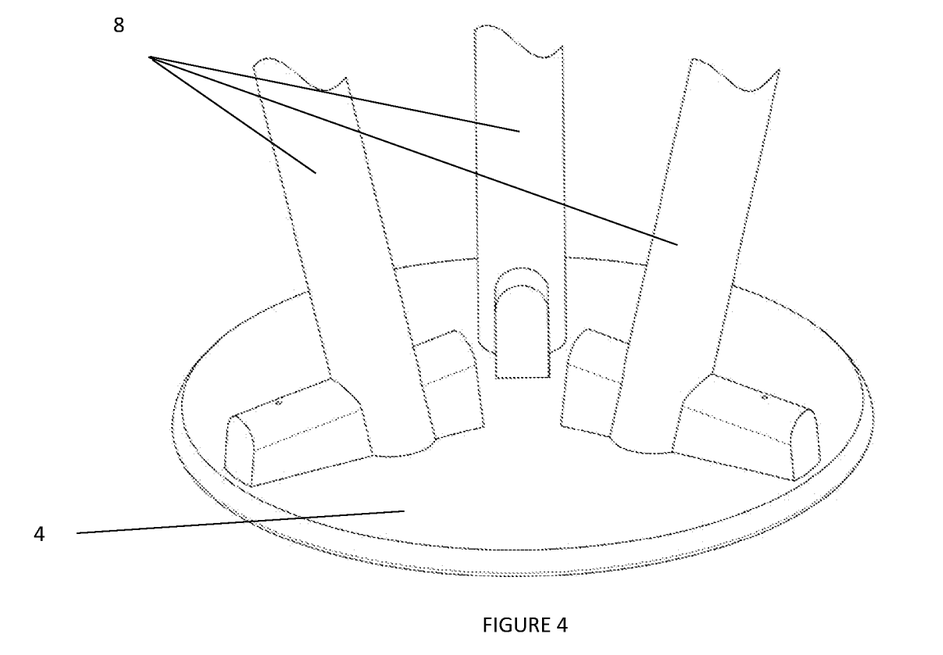
FIG. 4 is a schematic illustration of a perspective view from above of a further stage during assembly of the table of FIG. 5, in which three second pieces (i.e. legs) have been connected to the first piece (i.e. table top)
Figure 5:
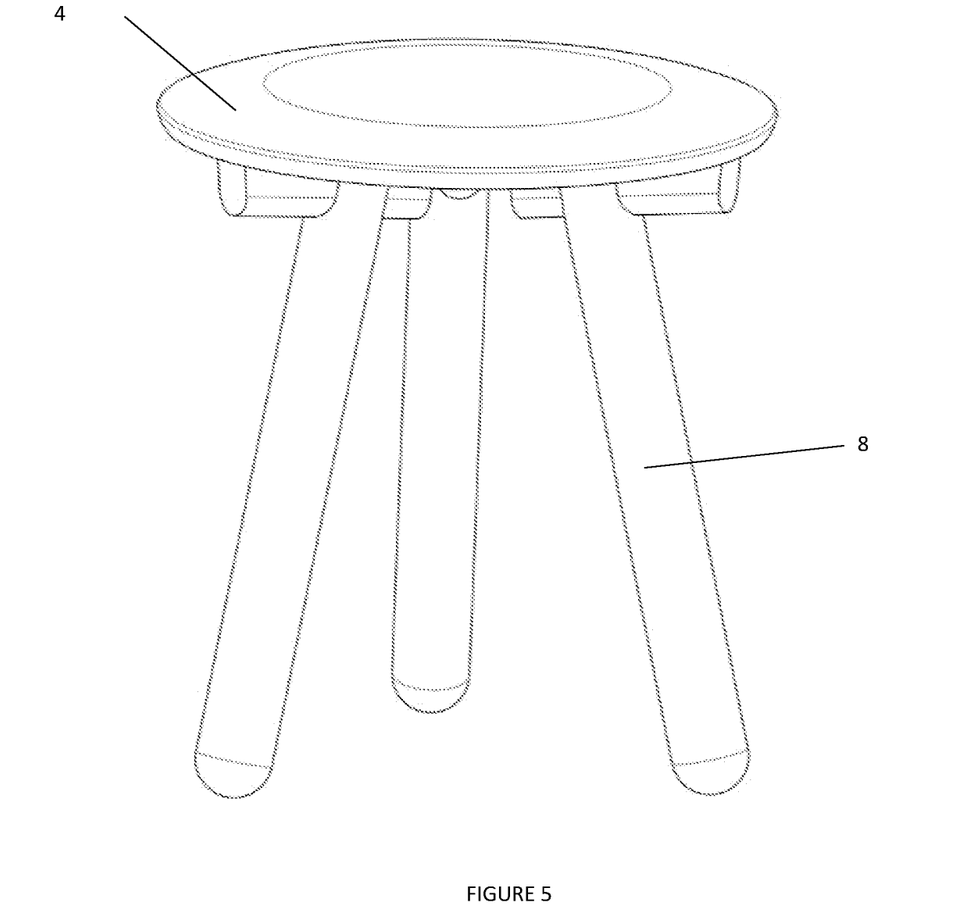
FIG. 5 is a schematic illustration of the table formed by connecting the first piece (i.e. table top) to three second pieces (i.e. legs) using the connection system of the present invention.
Figure 6:
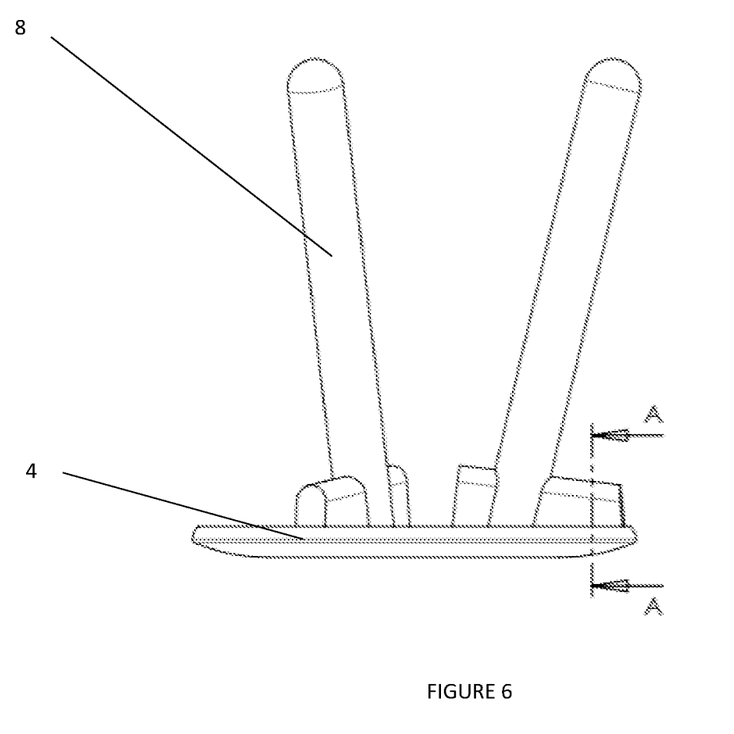
FIG. 6 is a schematic illustration of the table of FIG. 5 in an inverted position during assembly.
Figure 7:
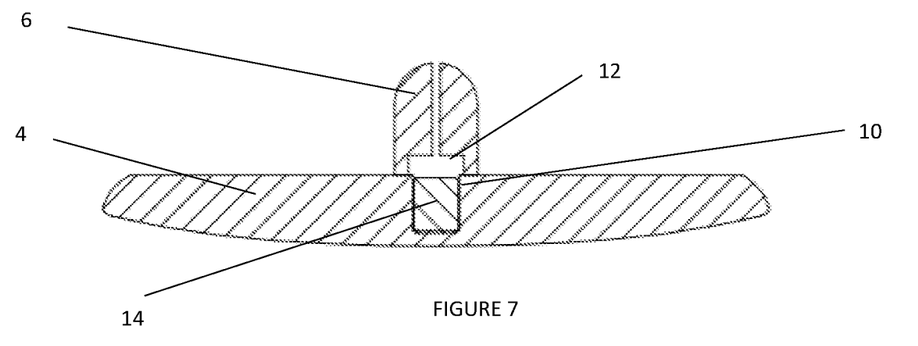
FIG. 7 is a schematic illustration of a cross-sectional view of a portion of FIG. 6 along axis A-A (i.e. the connection system comprising the upper portion of the second piece of the leg and the first piece) in an inverted position.
Figure 8:
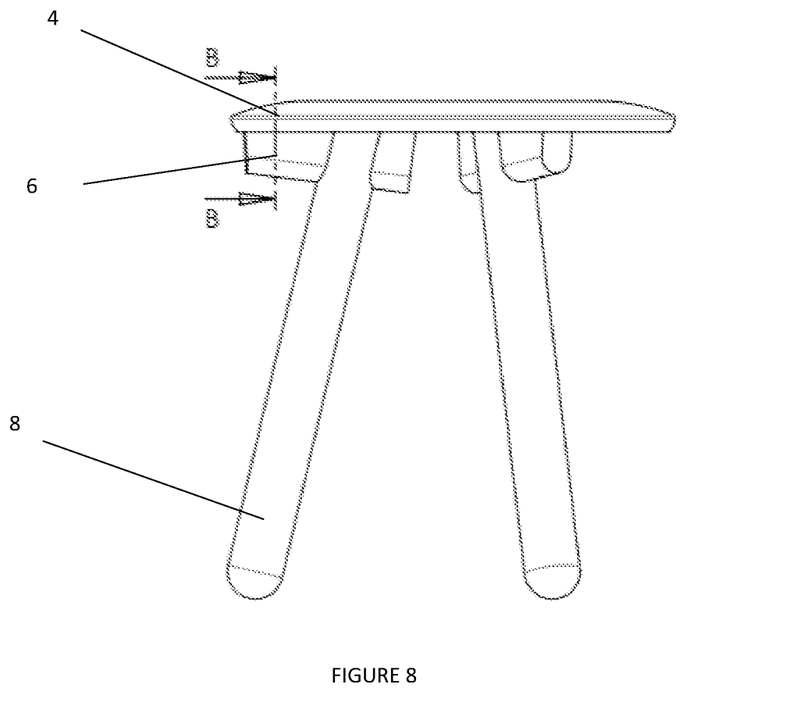
FIG. 8 is a schematic illustration of the table of FIG. 5 in an upright position after assembly.
Figure 9:
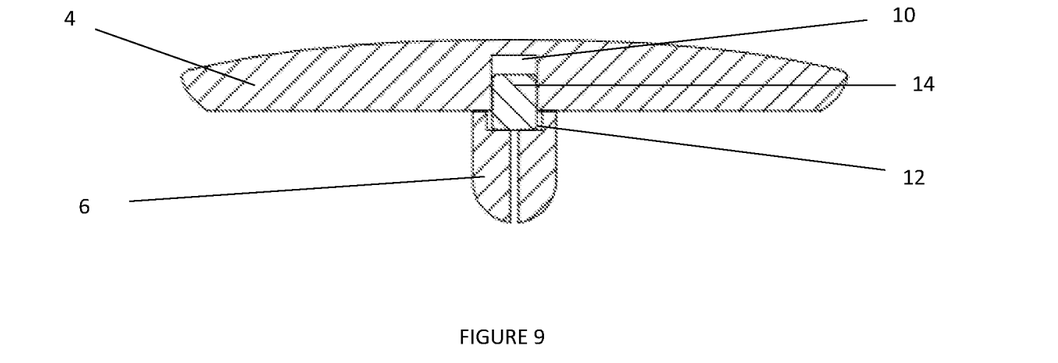
FIG. 9 is a schematic illustration of a cross-sectional view of a portion of the table of FIG. 9 along axis B-B (i.e. the connection system comprising the upper portion of the second piece of the leg and the first piece) in an upright position.

This process is repeated for each second piece, i.e. for all three legs 8 (FIG. 4, FIG. 6). The user then positions the table upright (FIG. 5). On inversion of the table to the upright position (FIG. 5, FIG. 8), the lock piece 14 moves from the first aperture 10 (FIG. 7) into the second aperture 12 (FIG. 9) under gravity and thereby locks the wedge 6 of the second piece 8 within the tapering recess 2 of the first piece 4 preventing unintended movement of the second piece 8 in an opposite sliding direction.

Should the user wish to disassemble the item of furniture, the user is required to follow the assembly steps in reverse. For example, the user must first invert the table to an upside down position (FIG. 6) causing the lock pin 14 to move into the first aperture 10. This enables each wedge 7 of the second pieces 8 to be slid in an opposing direction (i.e. towards the centre of the first piece 4) to allow the wedge 7 to be disengaged from the corresponding recess 2.

The connection system of the present invention therefore provides a quick and easy mechanism for engaging pieces together whilst also ensuring that the pieces remain engaged during use and preventing unintended removal thereof. The connection system of the present invention also enables the item to be assembled and disassembled easily without the need for additional tools.

Variation may be made to the aforementioned embodiment by deploying the invention in a different size or material in a different device. Some of these devices are mentioned below.

For example the invention may be employed in connecting different integers in eyewear devices, such as glasses and sunglasses.

Similarly the connection system for removably connecting first and second pieces of street furniture, such as signs, lighting systems and lamp posts and other street lighting device so as to enable columns to be lifted off a base rather than have to pivot in order to change lamps. Likewise domestic wall lights and fixtures may include a connection system for removably connecting first and second pieces together or to a wall.

The connection system for removably connecting first and second pieces may be included in construction equipment and devices, such as panel connections, building materials construction devices, civil engineering systems, roofing components and bridges.

The connection system for removably connecting first and second pieces may be formed in an electrical device and electrical connectors.

The connection system for removably connecting first and second pieces may be formed in or included with medical devices, such as prosthetic/replacement limbs and implants.

The connection system for removably connecting first and second pieces may be formed in automotive parts, such as car internal panels to enable them to be connected to frames; as well as enabling car seats to be connected to a car chassis.

The connection system for removably connecting first and second pieces may be utilised in aerospace components.

Furthermore the connection system for removably connecting first and second pieces may be formed in shop-fitting panels, displays and shelving systems.

Other examples of devices in which the connection system for removably connecting first and second pieces may be formed include cycling clips which connect to cycling shoes; and cameras which enable them to be connected to tripods or other support devices; and picture hangers (thereby beneficial for ease of location); and mobile telephone stands; and sports equipment, such as ski binders and water sport binding attachment; and snow shoes and hiking boots; and clothing, such as shoes and belts; and watch straps.

Further examples of devices in which the connection system for removably connecting first and second pieces may be formed include military (removable light to gun attachment or even scope); tools and power tools, such as sander pads, fishing reels and rods; other travel items such as travel mugs which may be configured to connect to mug holder in a vehicle; a device that connects a bottle carrier to a bicycle frame; a device that enables cycle lamps to be connected to a bicycle frame; a temporary fencing panel connection for construction sites and for surrounding or enclosing temporary events; marquees; traffic calming equipment and pedestrian walkways and barriers for providing guided walkways around construction sites, excavations and building sites.

Yet further examples of devices in which the connection system for removably connecting first and second pieces may be formed include a roof rack which perm its connection to a vehicle; a fixture for connection to a sailing or rowing (such as rowlock); and exercise equipment, such as pull up bars and similar self-assembly items for temporary connection to walls or door frames; and coat hooks which enable their temporary attachment to walls.

The invention claimed is:

1. A connection system for removably connecting first and second pieces one to another comprising:
 a tapering recess formed in, or connected to, the first piece, the tapering recess has an opening which is shaped and dimensioned to receive a wedge formed in, or connected to, the second piece, the wedge has a dovetail profile which is adapted to engage with walls of the recess, and the wedge is shaped and dimensioned to slide in a first direction and thereby wedge into the tapered recess;
 each piece has at least one aperture which receives a lock piece, the first and second pieces when connected and which when oriented in a user preferred direction, cause the lock piece to fall from a first aperture into a second aperture, thereby locking the wedge in the tapering recess and preventing movement in an opposite sliding direction.

2. The connection system according to claim 1, wherein the aperture in the first piece, and the aperture in the second piece face one another when the first and second pieces are properly connected.

3. The connection system according to claim 1, wherein the aperture in the first and second pieces is substantially cylindrical.

4. The connection system according to claim 1, wherein the depth of the second aperture is less than the depth of the first aperture.

5. The connection system according to claim 1, wherein the lock piece is substantially cylindrical.

6. The connection system according to claim 5, wherein the height of the lock piece is greater than the depth of the second aperture and is at least equal to the depth of the first aperture.

7. The connection system according to claim 1, wherein the dovetail profile comprises an angle of profile that is substantially the same as an angle of opening of the recess which receives the dovetail profile.

8. The connection system according to claim 1, wherein the lock piece is ferro-magnetic.

9. The connection system according to claim 8, wherein the lock piece is steel.

10. The connection system according to claim 1, wherein the recess is tear shaped in cross-section.

11. The connection system according to claim 1, wherein, in use, the lock piece falls from the first aperture into the second aperture and is retained therein by gravity.

12. The connection system according to claim 1, wherein a poke hole is provided in the second piece, leading to the second aperture, through which a rod may pass for displacing the lock piece from the second aperture to the first aperture.

13. An item of furniture comprising a connection system according to claim 1.

14. The item of furniture according to claim 13, wherein the furniture is from the group comprising:
 a chair,
 a bed,
 a stool,
 a table,
 a cabinet and
 a desk.

15. A method of manufacturing an item comprising a connected first and second pieces, the method comprising:
 obtaining a connection system as claimed in claim 1;
 inserting the wedge formed in, or connected to, the second piece into the opening of the tapering recess of the first piece;
 sliding the wedge in a first direction into the tapered recess causing the lock piece to fall from the first aperture into the second aperture thereby locking the wedge in the tapering recess and connecting the first and second pieces together.

* * * * *